US009848611B2

(12) United States Patent
Hallvardsson et al.

(10) Patent No.: US 9,848,611 B2
(45) Date of Patent: Dec. 26, 2017

(54) PIN BONE REMOVAL SYSTEM

(71) Applicant: MAREL ICELAND EHF, Gardabaer (IS)

(72) Inventors: Kristjan Hallvardsson, Reykjavik (IS); Haraldur Gudlaugsson, Reykjavik (IS)

(73) Assignee: MAREL ICELAND EHF, Gardabaer (IS)

( * ) Notice: Subject to any disclaimer, the term of this patent is extended or adjusted under 35 U.S.C. 154(b) by 0 days.

(21) Appl. No.: 15/326,107

(22) PCT Filed: Jul. 15, 2015

(86) PCT No.: PCT/EP2015/066175
§ 371 (c)(1),
(2) Date: Jan. 13, 2017

(87) PCT Pub. No.: WO2016/008926
PCT Pub. Date: Jan. 21, 2016

(65) Prior Publication Data
US 2017/0202228 A1    Jul. 20, 2017

(30) Foreign Application Priority Data

Jul. 15, 2014  (EP) .................................... 14177098
Nov. 3, 2014   (DK) ................................ 2014 70671

(51) Int. Cl.
*A22C 25/00*   (2006.01)
*A22C 25/16*   (2006.01)
(Continued)

(52) U.S. Cl.
CPC ........ *A22C 25/166* (2013.01); *A22C 17/0073* (2013.01); *A22C 25/08* (2013.01);
(Continued)

(58) Field of Classification Search
CPC ....... A22C 25/00; A22C 25/14; A22C 25/145; A22C 25/166
USPC ....... 452/135, 140, 149–153, 160, 161, 163, 452/170
See application file for complete search history.

(56) References Cited

U.S. PATENT DOCUMENTS

| 3,309,730 A | 3/1967 | Michael |
| 3,319,287 A | 5/1967 | Michael |

(Continued)

FOREIGN PATENT DOCUMENTS

WO    2013132068 A1    9/2013

OTHER PUBLICATIONS

Extended European Search Report for corresponding European Application No. 14177098.2, Jan. 20, 2015.
(Continued)

*Primary Examiner* — Richard Price, Jr.
(74) *Attorney, Agent, or Firm* — Justin J. Cassell; Workman Nydegger (57) ABSTRACT

A pin bone removal system involves automatically removing a pin bone area of a fish fillet when conveyed by a conveyor after undergoing a cutting process, and includes at least two side by side arranged conveyor belts extending from a first end for receiving a fish fillet to a second end. The internal arrangement of the side by side arranged conveyor belts is such that the spacing varies among first end the conveyor belts along their length. The transversal position of the fish fillet in relation to the first end is adjusted when the fish fillet arrives at the downstream position such that the position of the cut pin bone area is such that the cut pin bone area falls through the space while the remaining part of the fish fillet remains on the first and/or second conveyor belts.

15 Claims, 5 Drawing Sheets

(51) Int. Cl.
  *A22C 17/00* (2006.01)
  *A22C 25/08* (2006.01)
  *A22C 25/18* (2006.01)
  *B65G 47/71* (2006.01)
  *B65G 15/12* (2006.01)
  *B65G 21/10* (2006.01)

(52) U.S. Cl.
  CPC .............. *A22C 25/18* (2013.01); *B65G 15/12* (2013.01); *B65G 21/10* (2013.01); *B65G 47/71* (2013.01)

(56) References Cited

U.S. PATENT DOCUMENTS

| | | | | |
|---|---|---|---|---|
| 4,924,553 | A * | 5/1990 | Grosseholz | A22C 25/18 452/125 |
| 4,962,568 | A | 10/1990 | Rudy et al. | |
| 5,273,484 | A * | 12/1993 | Roger | A22C 25/00 426/513 |
| 5,830,052 | A * | 11/1998 | Wadsworth | A22C 25/166 452/136 |
| 7,165,667 | B2 | 1/2007 | Böcker et al. | |
| 7,857,686 | B2 * | 12/2010 | Arnason | A22C 25/166 452/161 |
| 8,956,205 | B2 * | 2/2015 | Kowalski | A22C 25/14 452/135 |
| 2007/0246328 | A1 | 10/2007 | Reznik | |
| 2007/0293132 | A1 | 12/2007 | Arnason | |
| 2012/0307013 | A1 * | 12/2012 | Hjalmarsson | A22C 17/0086 348/46 |

OTHER PUBLICATIONS

International Search Report for corresponding International PCT Application No. PCT/EP2015/066175, Mar. 15, 2016.

* cited by examiner

PIN BONE REMOVAL SYSTEM

FIELD OF THE INVENTION

The present invention relates to a pin bone removal system for automatically removing a pin bone area of a fish fillet when conveyed by a conveyor after undergoing a cutting process.

BACKGROUND OF THE INVENTION

Processing food products such as fish fillet has in the past often been a manual operation. In the recent years, companies have been moving towards more and more automation.

WO2013132068 discloses a cutting apparatus for automatically cutting food items conveyed on a conveyor. In cases where the food items are fish fillets and where the cutting includes cutting the pin bone area of a fish fillet, there is need for a kind of an extension to the cutting apparatus described in WO2013132068 for automatically removing the cut pin bone area.

U.S. Pat. No. 3,319,287 discloses a method of producing fish fillets free from pin bones by means of cutting free the pin bones on each side of the fish by two incisions extending up to the parapophyses in the region of the belly cavity, before the filleting operations.

U.S. Pat. No. 3,309,730 discloses a fish filleting machine having a knife arrangement for processing fish of different sizes.

Neither of these references disclose a system for automatically removing a pin bone area of a fish fillet after undergoing a cutting process.

SUMMARY OF THE INVENTION

On the above background it is an object of embodiments of the present invention to provide a pin bone removal system that is capable of automatically removing a pin bone area of a fish fillet after undergoing a cutting process.

In a first aspect of the invention a pin bone removal system is provided adapted to automatically removing a pin bone area of a fish fillet when conveyed by a conveyor after undergoing a cutting process, where the pin bone area has been cut from the remaining part of the fish fillet, the system comprises:
- a conveyor system comprising at least two side by side arranged conveyor belts extending from a first end to a second end, the first end acting as a receiving end where the fish fillet is received with the cut pin bone area, the internal arrangement of the side by side arranged conveyor belts being such that at a position downstream from the first end the side by side arranged conveyor belts are spaced apart,
- wherein the transversal position of the fish fillet in relation to the first end is adjusted such that when the fish fillet arrives at the downstream position the position of the cut pin bone area is such that the cut pin bone area falls through the space while the remaining part of the fish fillet remains on the at least two side by side arranged conveyor belts.

Accordingly, a simple solution is provided for fully automatically removing the pin bone area of the fish fillet. This pin bone area may as an example be cut by a cutting apparatus as disclosed in WO2013132068, where e.g. high pressure water jet that is operated by a control unit based in image data, e.g. X-ray data, is implemented as a cutting device.

The fact that the transversal position of the fish fillet in relation to the first end is adjusted in this way it is ensured that the cut pin bone area will be removed via the space. This may be achieved via gravity where the pin bone area will simply fall through the space, or and as will be discussed later, pin bone area removal device may be provided to provide external force on the pin bone area to ensure that it will fall there through.

The spaced apart part may be adapted to the width of the pin bone area, e.g. this may a one-time installation. In other instances, where e.g. much larger fish fillets (or much smaller) arrive where the width of the pin bone is significantly larger (or smaller), the distance between the spaced apart conveyor belts may be adjusted accordingly in a fully automatic way based on e.g. image data of the pin bone area.

In one embodiment, the downstream position may be the second end of the conveyor system. Thus, a simple solution is provided for receiving the fish fillets until the pin bone area is automatically removed.

In one embodiment, the pin bone removal system further comprises a pin bone area removal device arranged at the downstream position and a control device for controlling the pin bone area removal device, wherein the control device activates the pin bone area removal device when the cut pin bone area is at the downstream position for supporting the falling of the cut pin bone area through the space. The pin bone area removal device may comprise an air or fluid nozzle positioned above the conveyor system for supplying a force onto the cut pin bone area. Accordingly, it is ensured that the pin bone area will fall through the space, in case the gravity does not provide sufficient force to remove the cut pin bone area from the remaining part of the fish fillet. The pin bone area removal device is preferably fully controlled and is activated only for a short time, e.g. a fraction of a second, when the pin bone area is positioned at the space between the spaced apart belts.

In one embodiment, the pin bone removal system further comprises a positioning system comprising a moving mechanism for adjusting at least the first end transversally to the conveying direction, and a control unit for controlling the moving mechanism. Thus, it is ensured, via the positioning system, that the cut pin bone area will at all times be positioned above the space, irrespective of the different positions of the fish fillet on the conveyor. An imaging system, e.g. an X-ray device or any type of imaging device may be utilized to determine the position of the fish fillets on the conveyor and utilize this determined position to control the movement of the first end.

In one embodiment, the pin bone removal system further comprises a positioning system comprising a moving mechanism attached to an infeed conveyor having an outlet end arranged upstream to the first end to adjust at least the outlet end of the infeed conveyor transversally and thus the position of the fish fillet. Accordingly, the first end may be in a fixed position and where the adjustment of the fish fillets at the first end is performed via the infeed conveyor, where e.g. only the outlet end of the infeed conveyor is adjusted, or the whole infeed conveyor.

In one embodiment, the pin bone removal system further comprises a detector device adapted to detect the position of the fish fillet and/or the cut pin bone area, wherein the transversal position of the fish fillet related to the first end is adjusted based on the detected position. In one embodiment, the detector device comprises an X-ray device, which may in one embodiment be the X-ray device that was used in detecting the bones in the fish fillet. Thus one and the same device is used for detecting the bones used in operating the cutting device, e.g. a high pressure water cutter, that was used to make the cut around the pin bone area. Thus, one and the same imaging device may be implemented in providing the control data for performing the pre-cut, and to provide the data indicating the position of the fish fillet.

In one embodiment, the conveyor system comprises at least two side by side arranged conveyors and wherein each of the at least two side by side arranged conveyor belts are associated with the respective one of the side by side arranged conveyors.

In one embodiment, the control unit is further adapted to utilize image data indicating whether the incoming fish fillet is a left or right side fish fillet and to operate the pin bone removal system accordingly.

In one embodiment, the conveyor system comprises three side by side arranged conveyors for automatically removing a pin bone area of a fish fillet when conveyed by a conveyor which may be an infeed conveyor, the cutting process including a cutting process where the fish fillet is cut such that the loin has been cut from the belly without being separated from the belly, said three side by side arranged conveyors being configured for allowing an automatic separation of loin parts from the belly parts onto separate conveyors, depending on whether the fish fillets is a right fish fillet or a left fish fillet, the middle conveyor acting as a separating conveyor for separating the loin from the belly parts or the middle conveyor acting as a separating conveyor for separating the belly from the loin parts. The advantage of utilizing three conveyors is to, in addition to said automatic removal of the pin bone area, to enable an automatic separation of e.g. loin parts from the belly parts onto separate conveyors, depending on whether the fish fillets is a right fish fillet or a left fish fillet, where the middle conveyor acts as a kind of a separating conveyor for separating the loin from the belly parts or vice versa. The fish fillet is cut, for example pre-cut, such that the loin has been cut from the belly, but where they have not yet been separated from each other, i.e. moved away from each other. Accordingly, said control unit is further adapted to utilize image data indicating whether the incoming fish fillet is a left or right side fish fillet, to operate the pin bone removal system such that both the pin bone area is removed from the fish fillet, and also to ensure that e.g. the belly parts are separated by either the left most conveyor belt or the right most conveyor belt, where the loin part is separated by the middle conveyor belt, or vice versa.

In a second aspect of the invention a system is provided comprising the above mentioned pin bone removal system according to any of the preceding claims, where the system comprises a cut station comprising:
 a cutting device,
 an imaging device for providing image data of a fish fillet,
 a control unit for utilizing the image data in controlling the cutting device, where the controlling include cutting around the pin bone area of the fish fillet.

In a third aspect of the invention a method is provided for automatically removing a pin bone area of a fish fillet when conveyed by a conveyor after undergoing a cutting process using a pin bone removal system which comprises:
 a conveyor system comprising at least two side by side arranged conveyor belts extending from a first end to a second end, the first end acting as a receiving end where the fish fillet is received with the cut pin bone area, the internal arrangement of the side by side arranged conveyor belts being such that at the first end the conveyor belts are substantially adjacent to each other and at a position downstream from the first end the side by side arranged conveyor belts are spaced apart,
 wherein the transversal position of the fish fillet in relation to the first end is adjusted such that when the fish fillet arrives at the downstream position the position of the cut pin bone area is such that the cut pin bone area falls through the space while the remaining part of the fish fillet remains on the first and/or second conveyor belts.

In one embodiment, the method further comprises determining whether the fish fillet is a left or a right side fish fillet.

In one embodiment, the cutting process includes a cutting process where the fish fillet is cut such that the loin has been cut from the belly without being separated from the belly, said conveyor system comprising three side by side arranged conveyors, said method further comprising automatically separating the loin part from the belly part on separate conveyors, depending on whether the fish fillets is a right fish fillet or a left fish fillet, the middle conveyor acting as a separating conveyor for separating the loin from the belly parts or the middle conveyor acting as a separating conveyor for separating the belly from the loin parts.

In one embodiment, the step of adjusting the transversal position of the fish fillet in relation to the first end is based on position data of the fish fillet obtained from a detector device.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
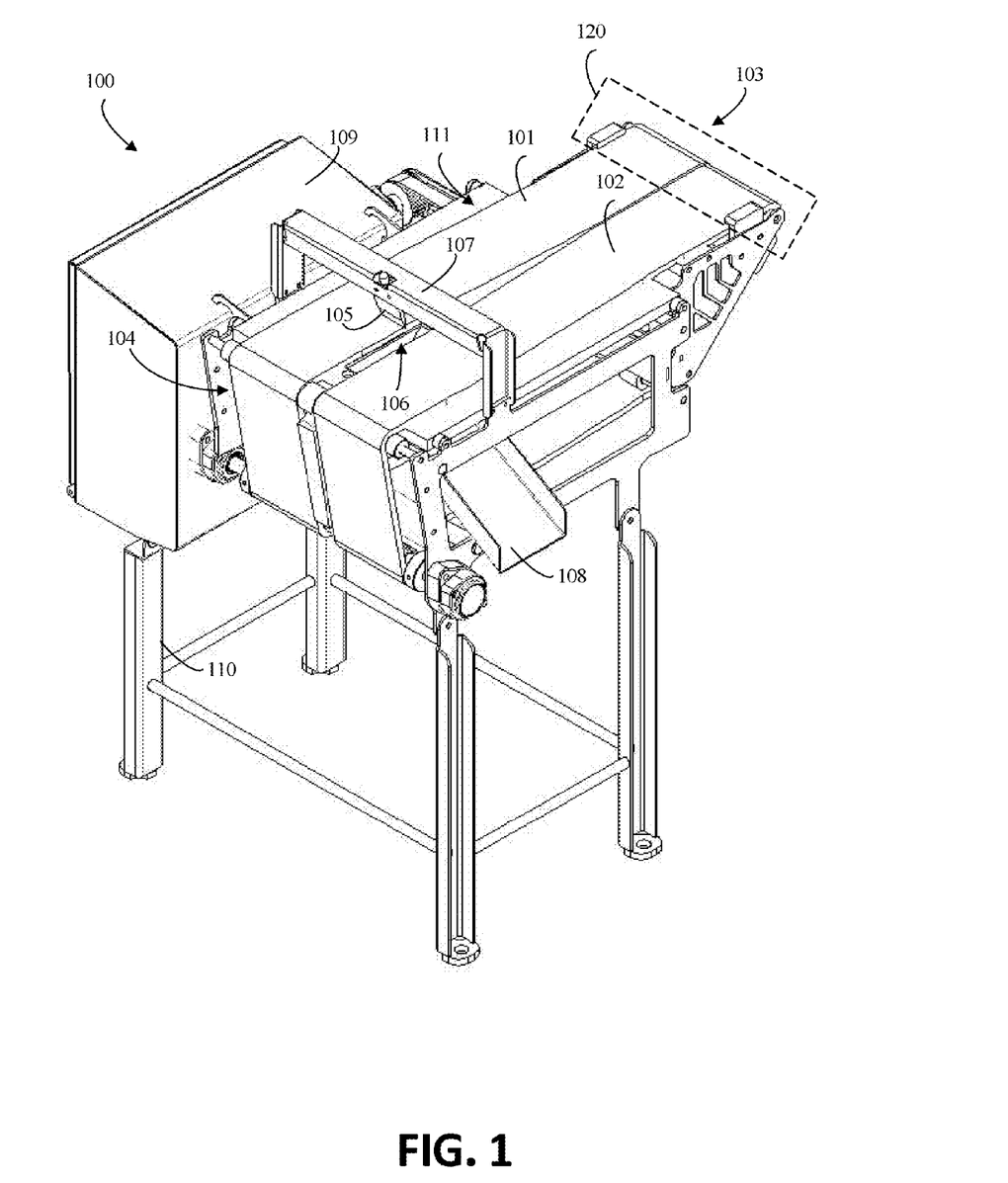
FIG. 1 depicts a pin bone removal system according to the present invention adapted to automatically removing a pin bone area of a fish fillet when conveyed by a conveyor after undergoing a cutting process.

FIG. 1 depicts a pin bone removal system 100 according to the present invention for automatically removing a pin bone area of a fish fillet when conveyed by a conveyor after undergoing a cutting process, where the pin bone area has been cut from the remaining part of the fish fillet but not yet separated from it. An example of such a cutting process is disclosed in WO2013132068, hereby incorporated in its entirety by reference, where e.g. an X-ray image is utilized as input data in operating a high pressure water cutter (or any other type of cutting tool).

The system 100 may be mounted to a frame structure 110 and comprises a conveyor system 111 comprising two side by side arranged conveyor belts 101, 102 extending from a first end 103 of the system to a second end 104. The first end 103 acts as a receiving end where the fish fillet is received with the cut pin bone area. As shown here, the internal arrangement of the side by side arranged conveyor belts 101, 102 is such that at the first end 103 the conveyor belts are substantially adjacent to each other and at a position 106 downstream from the first end 103 the side by side arranged conveyor belts are spaced apart.

The transversal position of the fish fillet in relation to the first end 103 is adjusted such that when the fish fillet arrives at the downstream position 106 the position of the cut pin bone area is such that the cut pin bone area is positioned and falls through the space while the remaining part of the fish fillet remains on the first and/or second conveyor belts. The falling through may be due to gravity, or an external pin bone area removal device 105 that may be mounted to a frame 107 may be used to supply an extra external force to ensure that the cut pin bone area falls through the opening 106.

The pin bone area removal device 105 may in an embodiment comprise an air or fluid nozzle positioned above the conveyor system for supplying the force onto the cut pin bone area, where the pin bone area removal device 105 is preferably operated and controlled by a control device that controls the pin bone area removal device 105 such that the control device activates the pin bone area removal device when the cut pin bone area is at the downstream position, but such a temporal start and stop creates obviously less noise. This controlling may be based on any tracking means that monitors the position of the fish fillets on the conveyor belts 101, 102, e.g. by using a tracking mechanism or by utilizing the speed of the conveyor belts 101, 102 to track where the fish fillets are at all times.

As depicted here, the downstream position is close to the second end 104 of the system, but the opening 106 may as an example be positioned closer to the second end 104, e.g. at the second end (few millimeters or centimeters from the second end), or closer to the first end 103.

As will be discussed in more details in relation to FIG. 2, in an embodiment the system 100 may further comprise a positioning system 120 comprising a moving mechanism for adjusting at least the first end transversally to the conveying direction, and a control unit for controlling the moving mechanism such that when the fish fillet arrives at the opening 106 the cut pin bone area of the fish fillet is at the opening 106.

The system 100 comprises in one embodiment a take-away system 108, which as shown here, may be an inclined chute 108 that receives the cut pin bone areas and guides them away from the system 100.

The conveyor system may comprise a single conveyor comprising the two conveyor belts 101, 102, or comprise two separate conveyors comprising the conveyor belts 101, 102, respectively.

The box shown here 109 may be a simple housing for housing the motor or motors for running the conveyor system 111.

Figure 2:
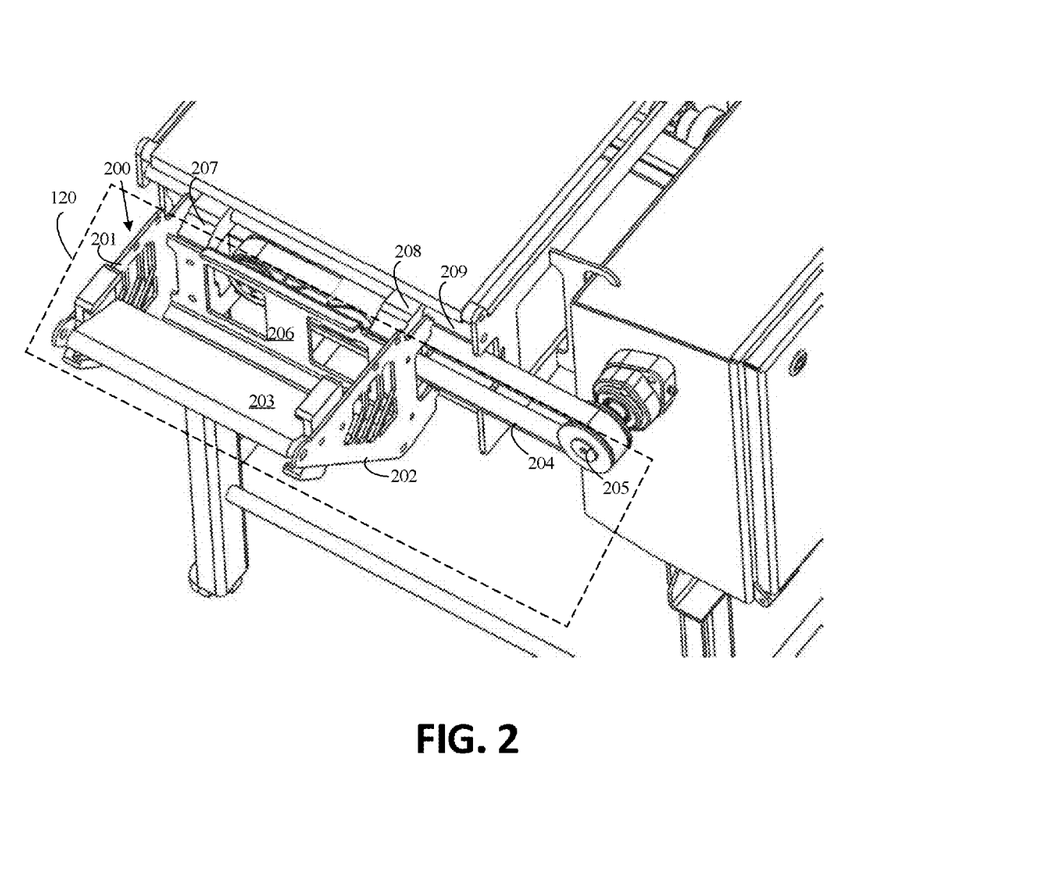
FIG. 2 depicts a zoomed up view of one embodiment of the positioning system, but in the absence of the conveyor belts.

FIG. 2 depicts a zoomed up view of one embodiment of the positioning system 120, but in the absence of the conveyor belts 101, 102. The positioning system 120 comprises a frame structure 200 having two side structures 201, 202, a plate 203 and a back side structure 206, where both the plate 203 and the back side structure 206 connects the two side structures 201, 202 together. The frame structure 200 further comprises two structures 207, 208 mounted to the back side structure and that are slideable connected to a sliding guide 209, in this case cylinder/rod.

Further, the frame structure 200 is attached to a belt 204 that is driven by a drive shaft 205 of a motor (not shown) and that is controlled by the control unit as discussed in relation to FIG. 1 that controls the back and forth movement of the frame structure 200 via back and forth movement of the belt 204.

Figure 3:
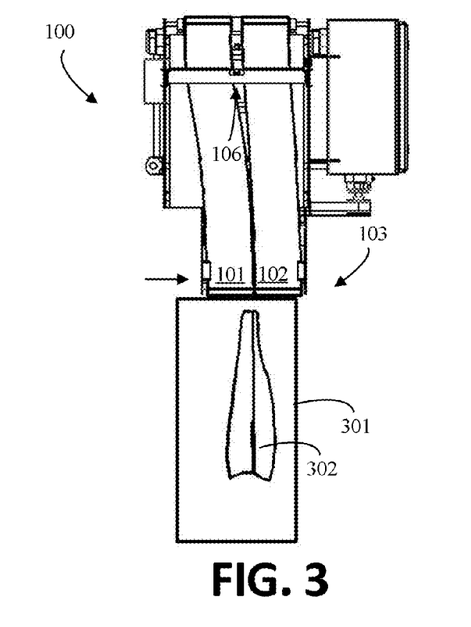
FIGS. 3 and 4 depict graphically the two different positions of the first end of the conveyor system.
Figure 4:
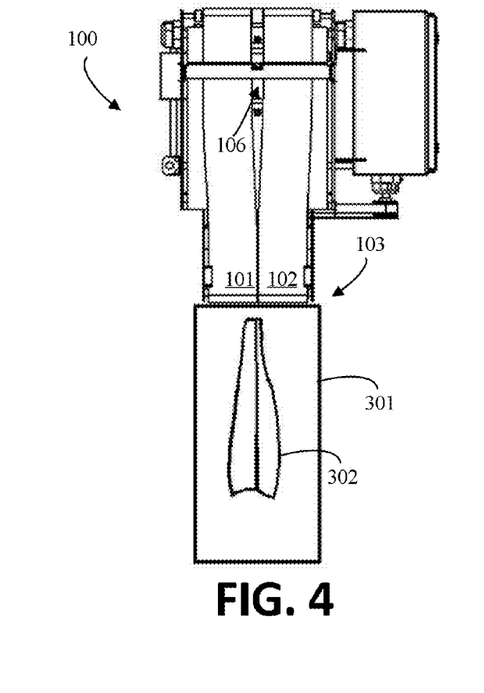

FIGS. 3 and 4 depict graphically the pin bone removal system where the first end 103 and thus the adjacent conveyor belts 101, 102 is in two different positions. In FIG. 3 the first end of the system 100 conveyor has been moved to the right as indicated by the arrow in relation to an infeed conveyor 301 on which an incoming fish fillet 302 is resting, and in FIG. 4 the first end is approximately at the center position. As already addressed, this displacement is to ensure that the cut pin bone area will be positioned at the space where the cut pin bone area falls there through.

Figure 5A:
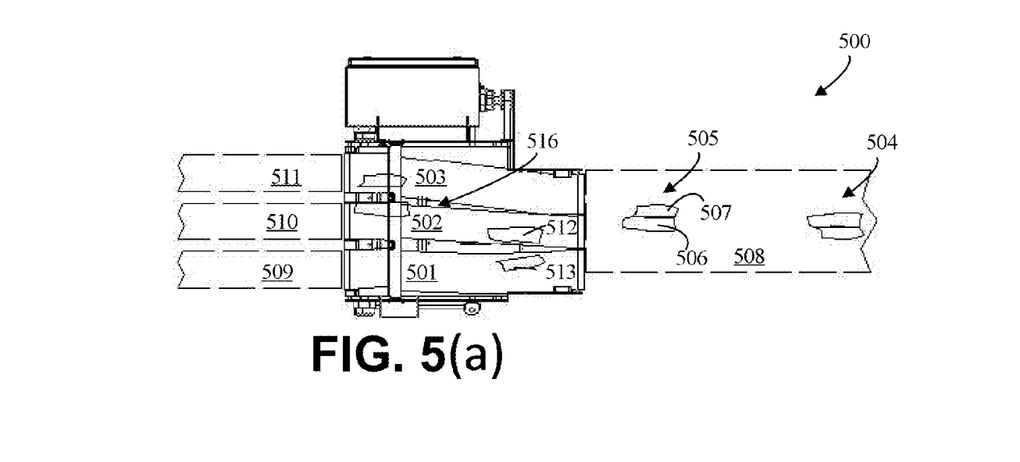
FIGS. 5a-5c depicts another embodiment of a pin bone removal system according to the present invention for automatically removing a pin bone area of a fish fillet.
Figure 5B:
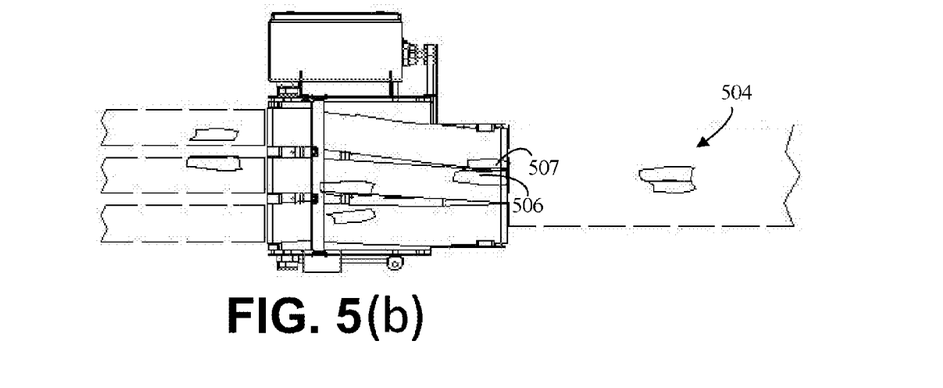
Figure 5C:
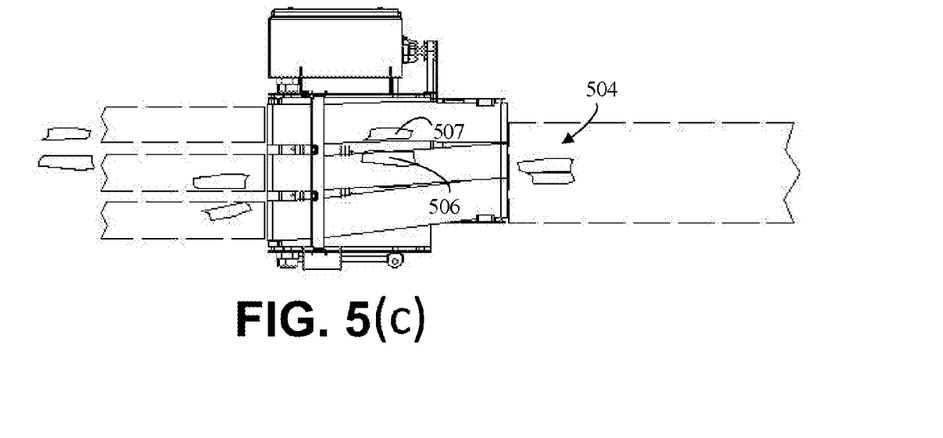

FIG. 5 depicts another embodiment of a pin bone removal system 500 according to the present invention for automatically removing a pin bone area of a fish fillet 504, 505 when conveyed by a conveyor which may be an infeed conveyor 508. The fish fillets 504, 505 show a right fillet 505 and a left fillet 504, both of which are cut, for example pre-cut, where e.g. the right fillet is divided into loin 506 and belly 507. As shown here in this example the tail part of the fish fillet may have been removed, but this does not necessarily have to be the case.

In this embodiment, the pin bone removal system 500 comprises three side by side arranged conveyor belts 501-503 instead of two as discussed in relation to FIG. 1 so as to enable separating the loin part 506 from the belly part 507, where the middle conveyor belt 502 acts as a separating conveyor for the loins 506, 512 and the first and the third conveyor belts 501, 503 are utilized as separating conveyors 501, 503 for the belly parts 507, 513, depending on whether the incoming fish fillets are right or left fillets.

FIG. 5a shows where the right fillet 505 is approaching the conveyor belts 501-503. Since the belly part 507 of the fish fillet is on the right side conveyor belt 503 will be utilized to receive the belly part. This embodiment of the pin bone removal system 500 may, as discussed in relation to FIG. 1, also comprise positioning system comprising a moving mechanism for adjusting the first end of the pin bone removal system 500, as shown in FIG. 5b transversally such that the when the fish fillet arrives at the opening the cut pin bone area of the fish fillet is at the opening 516. More importantly, the loin 506 and the belly parts are separated automatically from each other in a fully automatic way.

FIG. 5c depicts a similar scenario for the subsequent fish fillet 504 where the adjustment of the first end is adapted to the left fillet such that the belly parts is separated from the loin part by conveyor 501.

This embodiment shows also take-away conveyors 509-511, which may be considered as an optional feature for this embodiment, but any means may be provided for conveying the separated parts to subsequent processing station. As an example, the middle conveyor belt 510 may convey the loin parts to a packing area, whereas conveyors 509, 511 may convey the belly parts to subsequent processing stations or operators.

Figure 6:
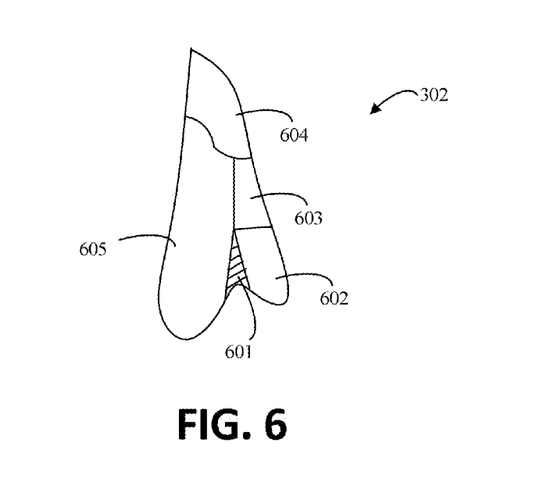
FIG. 6 depicts graphically an example of a fish fillet where a cut pin bone area is shown.

FIG. 6 depicts graphically an example of a fish fillet 302 where a cut pin bone area 601 is shown. The fish fillet shown here may further be cut into several areas 602-605 that remain on the first and/or the second conveyor belt after the cut pin bone area 601 has been removed.

Figure 7:
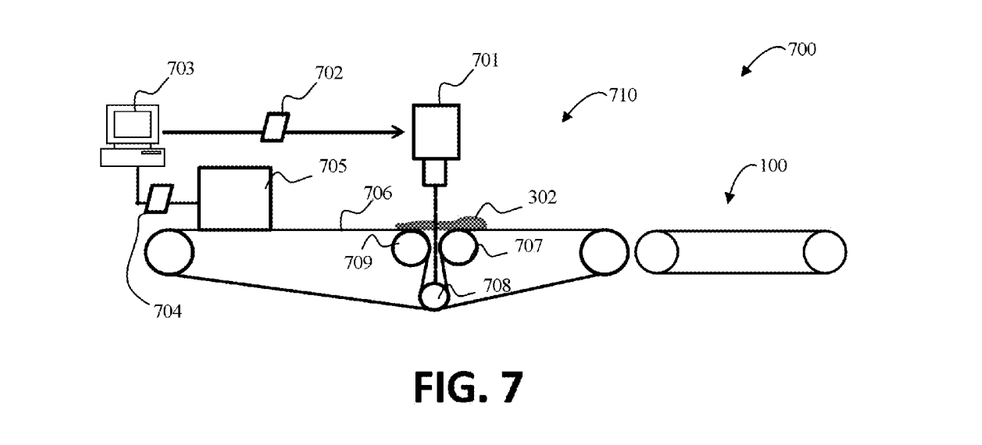
FIG. 7 shows a system according to the present invention for processing fish fillet.

FIG. 7 shows a system 700 according to the present invention for processing fish fillet 302, where the system comprises a cut station 710 comprising a cutting device 701, an imaging device 705, a control device 703 and a conveyor 706. The cut station 710 may be similar to the cutting apparatus disclosed in WO2013132068, where the imaging device may be a X-ray device, and where the conveyor may comprise a single conveyor belt that is bypassed via rollers 707-709, and where the cutting device 701 may e.g. be a high pressure water cutter that has a cutting plane that intersects with the opening/slit between rollers 707, 709 at all times. Rollers 707-709 may be movable back and forth and where the cutting device 701 follows the movement of the rollers 707-709.

The imaging device 705 provides image data 704 of the fish fillet 302 that is processed by the control device 703, e.g. a computer system provide a control data 702 for controlling the cutting device 701. The cutting of the fish fillet 302 may, in addition to cut around the pin-bone area 601, also include cutting the fish fillet into portions as depicted in FIG. 6.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A pin bone removal system adapted to automatically removing a pin bone area of a fish fillet when conveyed by a conveyor after undergoing a cutting process, where the pin bone area has been cut from a remaining part of the fish fillet, the pin bone removal system comprises:
    a conveyor system comprising at least two side by side arranged conveyor belts extending from a first end to a second end, the first end acting as a receiving end where the fish fillet is received with the cut pin bone area, an internal arrangement of the at least two side by side arranged conveyor belts being such that at a position downstream from the first end the at least two side by side arranged conveyor belts are spaced apart;
    wherein a transversal position of the fish fillet in relation to the first end is adjusted such that when the fish fillet arrives at the position downstream from the first end a position of the cut pin bone area is such that the cut pin bone area falls through a space between the at least two side by side arranged conveyor belts while the remaining parts of the fish fillet remains on the at least two side by side arranged conveyor belts.

2. The pin bone removal system according to claim 1, further comprising a pin bone area removal device arranged at the position downstream from the first end and a control device for controlling the pin bone area removal device, wherein the control device activates the pin bone area removal device when the cut pin bone area is at the position downstream from the first end for supporting falling of the cut pin bone area through the space between the at least two side by side arranged conveyor belts.

3. The pin bone removal system according to claim 2, wherein the pin bone area removal device comprises an air or fluid nozzle positioned above the conveyor system for supplying a force onto the cut pin bone area.

4. The pin bone removal system according to claim 1, further comprising a positioning system comprising a moving mechanism for adjusting at least the first end transversally to a conveying direction, and a control unit for controlling the moving mechanism.

5. The pin bone removal system according to claim 1, further comprising a positioning system comprising a moving mechanism attached to an infeed conveyor having an outlet end arranged upstream to the first end to adjust at least an outlet end of the infeed conveyor transversally and thus the position of the fish fillet.

6. The pin bone removal system according to claim 1, further comprising a detector device adapted to detect the position of the fish fillet and/or the cut pin bone area, wherein the transversal position of the fish fillet related to the first end is adjusted based on the detected position.

7. The pin bone removal system according to claim 6, wherein the detector device comprises a vision system such as an X-ray device.

8. The pin bone removal system according to claim 1, wherein the conveyor system comprises at least two side by side arranged conveyors and wherein each of the at least two side by side arranged conveyor belts are associated with a respective one of the side by side arranged conveyors.

9. The pin bone removal system according to claim 4, wherein said control unit is further adapted to utilize image data indicating whether the incoming fish fillet is a left or right side fish fillet and to operate the pin bone removal system accordingly.

10. The pin bone removal system according to claim 9, wherein the conveyor system comprises three side by side arranged conveyors, the cutting process including a cutting process where the fish fillet is cut such that a loin has been cut from a belly without being separated from the belly, said three side by side arranged conveyors being configured for allowing an automatic separation of loin parts from belly parts onto separate conveyors of the three side by side arranged conveyors, depending on whether the fish fillets is a right fish fillet or a left fish fillet, a middle conveyor acting as a separating conveyor for separating the loin from the belly parts or the middle conveyor acting as a separating conveyor for separating the belly from the loin parts.

11. A system for comprising the pin bone removal system according to claim 1, where the system comprises a cut station comprising:
    a cutting device,
    an imaging device for providing image data of a fish fillet,
    a control unit for utilizing the image data in controlling the cutting device, where the controlling include cutting around the pin bone area of the fish fillet.

12. A method of automatically removing a pin bone area of a fish fillet when conveyed by a conveyor after undergoing a cutting process using a pin bone removal system which comprises:
    a conveyor system comprising at least two side by side arranged conveyor belts extending from a first end to a second end, the first end acting as a receiving end where the fish fillet is received with the cut pin bone area, an internal arrangement of the at least two side by side arranged conveyor belts being such that at the first end the at least two side by side arranged conveyor belts are substantially adjacent to each other and at a position downstream from the first end the at least two side by side arranged conveyor belts are spaced apart;

wherein a transversal position of the fish fillet in relation to the first end is adjusted such that when the fish fillet arrives at the position downstream from the first end a position of the cut pin bone area is such that the cut pin bone area falls through a space between the at least two side by side arranged conveyor belts while the remaining part of the fish fillet remains on the at least two side by side arranged conveyor belts.

13. The method according to claim 12, further comprising determining whether the fish fillet is a left or a right side fish fillet.

14. The method according to claim 12, wherein said cutting process includes a cutting process where the fish fillet is cut such that a loin has been cut from a belly without being separated from the belly, said conveyor system comprising three side by side arranged conveyors, said method further comprising automatically separating a loin part from a belly part on separate conveyors of the three side by side arranged conveyors, depending on whether the fish fillet is a right fish fillet or a left fish fillet, a middle conveyor acting as a separating conveyor for separating the loin from the belly parts or the middle conveyor acting as a separating conveyor for separating the belly from the loin parts.

15. The method according to claim 12, wherein the step of adjusting the transversal position of the fish fillet in relation to the first end is based on position data of the fish fillet obtained from a detector device.

* * * * *